United States Patent [19]

Vernese

[11] 4,432,305
[45] Feb. 21, 1984

[54] ADJUSTABLE LIVESTOCK CHUTE

[75] Inventor: Michael P. Vernese, Paxico, Kans.

[73] Assignee: Circle V, Inc., Paxico, Kans.

[21] Appl. No.: 363,963

[22] Filed: Mar. 31, 1982

[51] Int. Cl.³ ............................................. A01K 1/06
[52] U.S. Cl. ..................................... 119/98; 119/99; 292/58
[58] Field of Search ................. 119/98, 99, 103, 102, 119/20; 292/57, 58

[56] References Cited

U.S. PATENT DOCUMENTS

| | | | |
|---|---|---|---|
| 629,675 | 7/1899 | Fox | 119/98 |
| 2,483,516 | 10/1949 | Babson | 119/27 |
| 2,593,597 | 4/1952 | Palmer | 119/27 |
| 2,692,577 | 10/1954 | Thomas | 119/27 |
| 2,714,367 | 8/1955 | Arnold | 119/27 |
| 2,786,449 | 3/1957 | Dahlerup | 119/99 |
| 2,995,111 | 8/1961 | Darden | 119/99 |
| 3,051,127 | 8/1962 | Norbury | 119/99 |
| 3,370,835 | 2/1968 | Crowson | 256/26 |
| 3,631,839 | 1/1972 | Postigo | 119/20 |
| 4,027,629 | 6/1977 | Pearson | 119/99 |
| 4,201,158 | 5/1980 | Parker | 119/98 |

*Primary Examiner*—Hugh R. Chamblee
*Attorney, Agent, or Firm*—Litman, Day & McMahon

[57] ABSTRACT

A livestock chute including a pair of opposite side frames positioned in spaced relation and each having a first and a second end. First and second end panels extend transversely between and interconnect the side frames. The second end panel is longitudinally movable relative to the side frames between the first and second ends thereof. An enclosure for an animal is formed by the side frames and the end panels, the enclosure being accessible through an access member mounted on one of the side frames and movable between open and closed positions.

23 Claims, 9 Drawing Figures

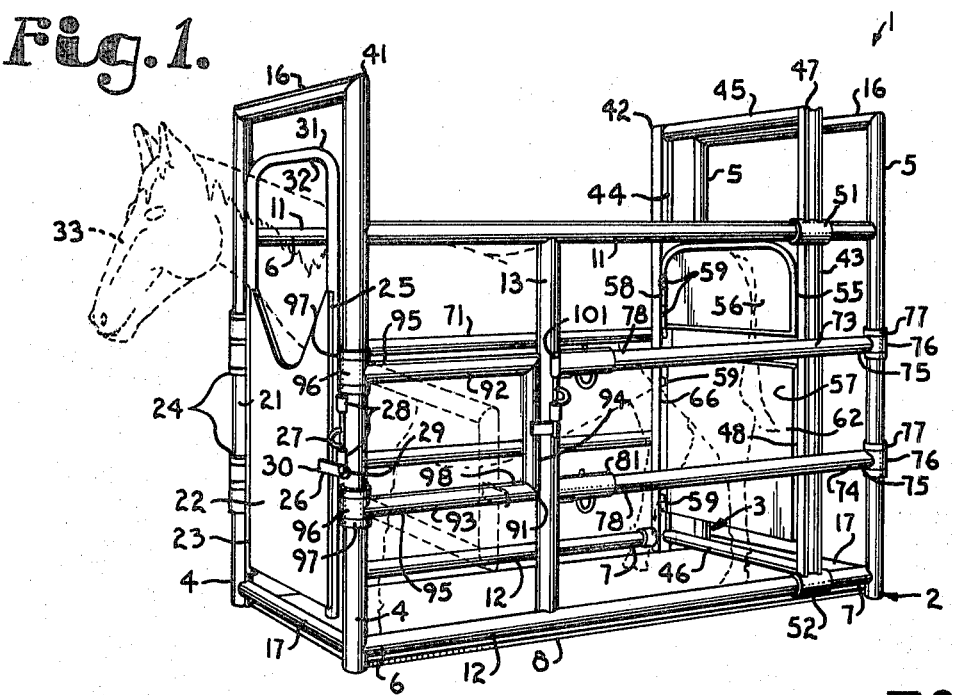

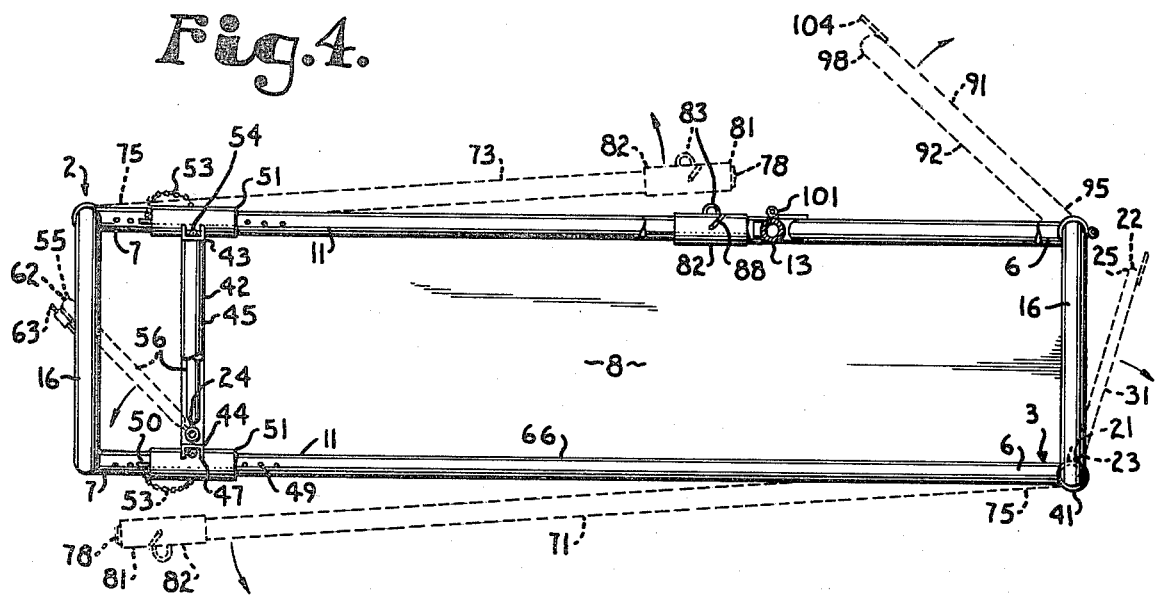
Fig.4.
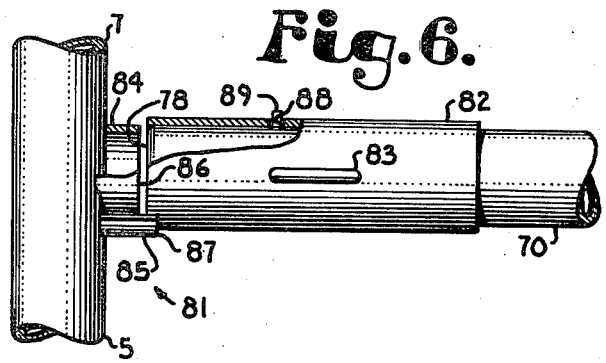
Fig.6.
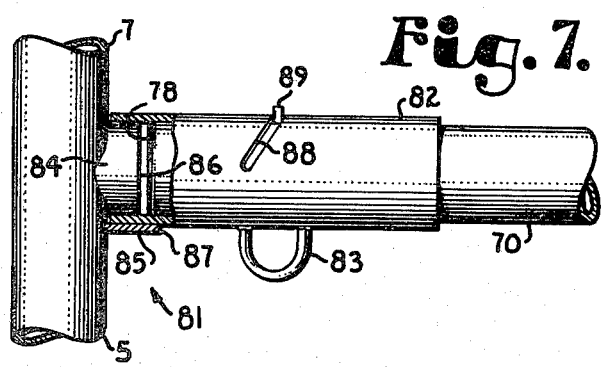
Fig.7.
Fig.5.
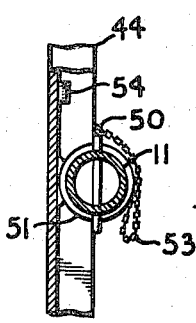
Fig.8.

ADJUSTABLE LIVESTOCK CHUTE

BACKGROUND OF THE INVENTION

1. Field of the Invention.

This invention relates to the field of animal husbandry, and in particular to an adjustable livestock chute with movable access members.

2. Description of the Prior Art

In the field of animal husbandry, livestock chutes are used for immobilizing animals in standing positions. Restraining the animal in such a device serves to both protect the animal from sudden and potentially harmful movements while an operation is being performed thereon and also to protect the person performing the operation from injury by the animal.

For example, chutes may be used when horses are cleaned, palpated, shoed, trimmed, booted, hooved, saddled, branded and castrated. Cattle may also be restrained in such chutes for treatment which further includes dehorning. With the animal securely restrained, the person attending it is in little or no danger of being kicked, bitten or otherwise injured. Further, sudden movements on the part of the animal are restrained to prevent the chute with the animal therein from being toppled over.

One prior art method of restraining animals involves moving one or both sides of the chute frame inwardly whereby the animal therein is pinioned. Such livestock chutes may be referred to as "squeeze" chutes and are exemplified by the cattle squeeze shown in the Darden U.S. Pat. No. 2,995,111. The device shown therein utilizes an hydrualic system for moving side members against or away from livestock. The Pearson U.S. Pat. No. 4,027,629 also shows a squeeze with laterally movable sides. However, the hydraulic system and manually operated system of levers for actuating the sides of the Darden and Pearson devices respectively are relatively complex and thus contribute significantly to the costs of these chutes. Also, clamping a large animal such as a horse between the steel sides of a squeeze chute often causes it to panic and struggle. Furthermore, animals subjected to such treatment tend to associate squeeze chutes with unpleasant experiences and thus resist being led into them for treatment.

Other prior art livestock enclosures are longitudinally adjustable so that different sized animals may be securely retained front and back therein. One advantage of this arrangement is that an animal confined by close fitting front and back panels has little room within which to kick. Also, a group of a given type of animal, for example a herd of horses, is subject to greater variations in length than width. Thus, a chute may be sized for the widest animal likely to be encountered and even smaller animals in the group will be substantially confined laterally if placed therein. By properly adjusting such a chute lengthwise, all of the livestock in the group may be accommodated and substantially restrained.

Furthermore, for confining horses, it is desirable to slide an end panel against the back of a horse already positioned in the chute. Horses generally respond by leaning back against the panel in a relaxed position, which facilitates their treatment. In such a position, the horse is supported more by leaning against the panel than by its back legs, and is thus less likely to kick or rear up.

The Palmer U.S. Pat. No. 2,993,597 shows a milking plant with longitudinally adjustable stalls for cattle of various lengths. Another type of longitudinally adjustable pen is shown in the Arnold U.S. Pat. No. 2,714,367, which includes both telescoping longitudinal and transverse members. However, with both of the Palmer and Arnold structures, an entire end of the chute must be moved longitudinally to accomplish an adjustment of length, which may be difficult with an animal therein. Also, neither shows access members which may be moved out of the way for providing access to various parts of the animal.

In fact, the sides of many prior art chutes, while effectively providing restraint means for an animal therein, impede access of an attendant to the animal's body.

Heretofore, there has not been available a livestock chute which forms a longitudinally adjustable enclosure with an end panel slidably positioned between ends of its side frames and access members which may be swung away from the side frames.

SUMMARY OF THE INVENTION

In the practice of the present invention, a livestock chute is provided which includes a pair of opposite side frames positioned in spaced relation and each having a first and a second end. First and second end panels are attached to and extend transversely between the side frames and form an enclosure therewith. The second end panel is longitudinally movable relative to the side frames between the first and second ends thereof. An access member has a proximate end pivotally connected to one of the side frames and a distal end adapted for attachment thereto. Latch means are provided for releasably securing the access member distal end to the one side frame.

The principal objects of the present invention are: to provide a livestock chute for restraining livestock therein; to provide such a chute which is adapted for substantially immobilizing an animal therein; to provide such a livestock chute which forms a longitudinally adjustable enclosure; to provide such a livestock chute with a pair of side frames and an end panel longitudinally slidable between ends of the side frames; to provide such a livestock chute which includes an access member movably mounted on one of the side frames; to provide such a livestock chute which includes latch means for positively securing the access member to the one side frame in a closed position; to provide such a livestock chute which includes first and second end panels with respective gates for ingress and egress to the enclosure; to provide such a livestock chute which includes a plurality of access members; to provide such a livestock chute wherein the second end panel my be pushed against the back of an animal; and to provide such a livestock chute which is economical to manufacture, efficient in operation, capable of a long operating life and particularly well adapted for the proposed use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a livestock chute embodying the present invention.

FIG. 2 is a front elevational view of the livestock chute.

FIG. 3 is a fragmentary side elevational view of the livestock chute.

FIG. 4 is a top plan view of the livestock chute.

FIG. 5 is a back elevational view of the livestock chute.

FIG. 6 is an enlarged, fragmentary, side elevational view of the livestock chute particularly showing an access member latch in an unlocked position.

FIG. 7 is an enlarged, fragmentary, side elevational view of the livestock chute particularly showing the access member latch shown in FIG. 6 in a locked position.

FIG. 8 is an enlarged, fragmentary, vertical cross-sectional view of the livestock chute taken generally along line 8—8 in FIG. 3 and particularly showing a second end panel sleeve slidably mounted on a side frame longitudinal member.

FIG. 9 is an enlarged, fragmentary front elevational view of the livestock chute particularly showing a latch for a gate.

DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

For purposes of description herein, the terms "upper", "lower", "vertical", "horizontal" and derivatives thereof shall relate to the invention as oriented in FIG. 3. The terms "front" and "back" and derivatives thereof shall relate to the directions to the right and left respectively of the invention as oriented in FIG. 3. However, it is to be understood that the invention may assume various alternative orientations, except where expressly specified to the contrary.

Referring to the drawings in more detail, the reference numeral 1 generally designates a livestock chute including a pair of opposite left and right side frames 2 and 3 positioned in spaced relation. The side frames 2 and 3 substantially lie in respective vertical, parallel planes. Each side frame 2 and 3 includes first and second upright corner posts 4 and 5 mounted at respective first and second ends 6 and 7 thereof. A floor 8 is attached to lower ends of the corner posts 4 and 5. Upper and lower longitudinal members 11 and 12 extend between the corner posts 4 and 5 of each side frame 2 and 3 in substantially parallel, horizontal spaced relation. Furthermore, the left side frame 2 has an intermediate upright post 13 connected to and extending between the upper and lower longitudinal members 11 and 12 thereof.

The side frames 2 and 3 are interconnected by pairs of upper and lower transverse members 16 and 17 respectively extending between and connected to corresponding pairs of front and back upright corner posts 4 and 5. The side frames 2 and 3 are substantially rigid and are rigidly interconnected with each other by the transverse members 16 and 17.

The first corner posts 4 and the upper and lower transverse members 16 and 17 extending therebetween form a first or front gate opening 21 for a first or front gate 22. The first gate 23 includes a proximate edge 23 hingedly mounted on the front corner post 4 of the right side frame 2 by suitable hinges 24. The first gate 22 also includes a distal edge 25 adapted for selective attachment to the left side frame front corner post 4 by a latch 26. The latch 26 comprises a bolt 27 slidably received in keepers 28 and a tab 30 extending from the gate distal edge 25 for selective retention by the bolt 27.

The first gate 22 includes a yoke 31 forming an opening 32 for the head and neck of an animal, such as a horse 33. The upper and lower transverse members 16 and 17 extending between the front corner posts 4 and the gate 22 collectively form a first or front panel 41 extending transversely between and interconnecting the side frames 2 and 3 at their first ends 6.

A second or back end panel 42 extends transversely between and interconnects the side frames 2 and 3 at their second ends and is longitudinally slidable with respect thereto. The second end panel 42 comprises left and right panel uprights 43 and 44 respectively interconnected by upper and lower cross-pieces 45 and 46 extending substantially horizontally therebetween and forming a rigid second end panel frame 47 which defines a second gate opening 48. Upper and lower sleeves 51 and 52 respectively are attached to the outside of each panel upright 43 and 44 and slidably receive the corresponding upper and lower longitudinal members 11 and 12 respectively.

Lock means for securing the second end panel 42 in a predetermined position between the side frame ends 6 and 7 includes a plurality of linearly spaced receivers 49 through each longitudinal member 11 and 12 adjacent a respective side frame second end 7. Each receiver 49 is adapted to receive a respective pin 50 therethrough, which engages a respective sleeve 51 or 52 and prevents longitudinal sliding thereof in one direction. Generally, the pins 50 would be placed in a receiver 49 immediately behind (toward the side frame second end) of the respective sleeve 51 or 52. Thus, when the second end panel 42 is positioned agaist the back of the horse 33, the pins 50 will prevent the horse 33 from pushing the second end panel 42 back. The pins 50 are secured to respective sleeves 51 and 52 by chains 53 and may be stored in keepers 54 on respective second end panel uprights 43 and 44 when not placed in receivers 49.

A second gate assembly 55 is provided for selectively closing the second gate opening 48 and includes upper and lower portions 56 and 57 respectively. The second gate portions 56 and 57 each display a proximate edge 58 hingedly attached to the right panel upright 44 by suitable hinges 59. Each gate portion 56 and 57 also displays a respective distal edge 62 adapted for selective attachment to the left panel upright 43 by a latch 63. The latches 63 each include a bolt 64 slidably mounted in a keeper 67 on the respective gate portion 56 and 57 selectively received in a respective loop 65 attached to the left panel upright 43.

The side frames 2 and 3 and the end panels 41 and 42 form an enclosure 66 for receiving the horse 33. The length of the enclosure 66 is adjusted by longitudinally moving the second end panel 42 with respect to the side frames 2 and 3. Preferably, with the head and neck of the horse 33 in the opening 32, the second gate assembly 35 should be at or near the back of the horse 33 whereby its longitudinal movement within the enclosure 66 is substantially prevented.

The enclosure 66 is further enclosed by upper and lower right access members 71 and 72 respectively attached to the right side frame 3. Access to the enclosure 66 through the left side frame 2 may be had through upper and lower left access members 73 and 74 respectively. The access members 71, 72, 73 and 74 each display a proximate end 75 pivotally attached to a respective corner post 4 or 5 by a hinge sleeve 76 pivotally receiving the corner post 4 or 5 and retained in a predetermined position with respect thereto by a pair of annular retainers 77 fixedly mounted on the corner post 4 or 5.

The access members 71–74 also display respective distal ends 78 adapted for selective attachment to respective side frames 2 and 3 by access member latches 81. Each access member latch 81 includes a latch sleeve 82 rotatably and slidably mounted on a respective access member 71–74, a handle 83 on the latch sleeve 82, a projection 84 integrally connected to and extending from a respective second corner post 5 for the intermediate post 13 and an upwardly concave and open guide 85 positioned below the projection 84. Each projection 84 and the guide 85 associated therewith are fixedly attached to and cantilevered outwardly from a respective second corner post 5 or the intermediate post 13. The projections 84 and the guides 85 associated therewith are slightly spaced in order to receive a respective latch sleeve 82 therebetween whereby the latch sleeves 82 may be slid longitudinally against the second post 5 or the intermediate post 13. Also, the guides 85 terminate at free ends 87 positioned outwardly beyond free ends 86 of associated projections 84 so that the sleeves 82 may be first received on respective guides 85 for alignment with respective projections 84 and then slid longitudinally to their locked positions.

The access member latches 81 also include means for simultaneously longitudinally sliding and rotating respective latch sleeves 82. Each sleeve 82 includes an arc-shaped slot 88 extending diagonally across the sleeve 82 and adapted to slidably receive a respective guide pin 89 therein. The guide pins 89 are fixedly attached to and extend outwardly from respective access member distal ends 78. With the sleeve in its locked position, as shown in FIG. 7, its handle 83 extends downwardly, and the guide pin 89 is positioned in the rearmost end of the slot 82. To open the access member latch 81, the sleeve 82 is rotated on the respective access member 73 or 74 with the handle 83 approximately 90 degrees. The relative rotation between the sleeve 82 and the access member 73 or 74 causes a simultaneous, longitudinal sliding whereby the sleeve 82 is withdrawn from the projection 84. With the latch 81 unlocked, its handle 83 extends substantially horizotally and outwardly (FIG. 6), and the sleeve 82 is still supported by the guide 85, though clear of the projection 84. The access member 73 may thus be easily lifted off of the guide 85 and swung outwardly.

A side access gate 91 is mounted on the left first corner post 4. The side access gate 91 comprises upper, lower and end members 92, 93, and 94 respectively integrally connected together in a U-shaped configuration. The upper and lower members 92 and 93 terminate at proximate ends 95 pivotally mounted on the left side frame first corner post 4 by hinge sleeves 96 pivotally receiving the left first corner post 4. Pairs of annular retainers 97 are each fixedly attached to the left first corner post 4 and receive the hinge sleeves 96 therebetween. The upper and lower members 92 and 93 also display distal ends 98 integrally and rigidly connected to the end member 94 at substantially right angles with respect thereto.

The end member 94 may be releasably attached to the intermediate post 13 by a latch 101 including a bolt 102 slidably received in keepers 103. The bolt 102 is adapted for selectively engaging a tab 104 extending from the end member 94 and retaining it against the intermediate post 13 whereby the side access gate 91 is retained in its closed position. A handle 105 is provided for sliding the bolt 102.

The upright posts 4, 5 and 13, the upper and lower longitudinal members 11 and 12, the upper and lower transverse members 16 and 17, the access members 71–74 and the side access gate members 92–94 all comprise longitudinal bars of, for example, heavy gage steel pipe connected together by suitable connection means, such as welding. The sleeves 51, 52, 76, 82 and 96 preferably also comprise heavy gage steel pipe having slightly larger inside diameters than the outside diameters of the posts and members on which they are received, for example, three and one-fourth inches (I.D.) and three inches (O.D.) respectively. However, a variety of suitable structural shapes may be successfully employed with the present invention.

An exemplary use of the livestock chute 1 for restraining the horse 33 is as follows. The first gate 22 is closed and latched and the second gate 55 is opened. The horse 33 is then led past the second corner posts 5, through the second gate opening 48 and into the enclosure 66. The horse 33 inserts its head and neck through the opening 32 in the first gate 22 and is thereby prevented from rearing up by the yoke 31. The second gate assembly 55 is then closed and latched behind the horse 33.

The second end panel 42 may be placed at a predetermined position longitudinally with respect to the side frames 2 and 3 either before or after the horse 33 enters the enclosure 66. Preferably, the second end panel 42 is either at or near the back of the horse 33 whereby longitudinal movement within the enclosure 66 is substantially prevented. Also, the ability of the horse to kick is limited by the first gate 22 and the second gate lower portion 57. Placing the second end panel 42 against the back of the horse 33 causes many horses to instinctively lean against it in a relaxed position, with part of their weight taken off of their hind legs. The calming effect of this procedure facilitates treatment of the horse.

Lateral movement of the horse 33 is substantially limited by the access members 71, 72, 73 and 74 and by the side access gate 91. With the gates 22, 55 and 91 and the access members 71–74 in their respective closed and latched positions, the horse 33 is substantially immobilized in a standing position within the enclosure 66. An attendant may thus perform a variety of necessary operations on the horse 33. The livestock chute 1 will protect the horse from injury caused by sudden and excessive movements and also protect the attendant from injuries resulting therefrom.

Access may be had as required to virtually all parts of the horse's body by selectively swinging away second gate portions 56 and 57, access members 71–74 and the side access gate 91. The longitudinal access members 71 and 72 mounted on the right side frame 3 may also be swung open to remove the horse 33 through the right side frame 3 if, for example, it has collapsed in the enclosure 66 and cannot be removed through the gate openings 21 or 48. It will be appreciated that any one of the above gates and members may be swung away for access to the horse 33 which will continue to be restrained by those remaining in their closed positions.

The livestock chute 1 may be fabricated as a trailer for towing behind a vehicle with wheels and a tongue having a bumper hitch (not shown). Thus constructed, the chute 1 could be transported to various sites where needed, as by a veterinarian. Also, lead-in panels (also not shown) may be folded against the side frames 2 and 3 for transportation and swung out to a funnel-like configuration with respect to the second gate opening 48 to facilitate leading animals thereinto.

It is to be understood that while certain forms of the present invention have been illustrated and described herein, it is not to be limited to the specific forms or arrangement of parts described and shown.

What is claimed and desired to secure by Letters Patent is:

1. A livestock chute, which comprises:
   (a) a pair of opposite side frames placed in spaced relation and each having a first and a second end;
   (b) a first end panel extending transversely between and interconnecting said side frames; and
   (c) a second end panel extending transversely between and interconnecting said side frames, said second end panel being longitudinally movable relative to said side frames between said first and second ends thereof and said second end panel including:
      (1) a second end panel frame movably mounted on said side frames and forming a gate opening providing access to said enclosure;
      (2) a gate swingably mounted on said second end panel frame, said gate being movable between an open position providing access to said enclosure through said gate opening and a closed position substantially blocking said gate opening; and
      (3) said latch means for releasably securing said gate in its closed position;
   (d) an enclosure for an animal formed by said side frames and said first and second end panels.

2. The livestock chute according to claim 1 wherein said first end panel includes:
   (a) a first gate opening;
   (b) a first gate swingably mounted on said first end panel, said gate being movable between an open position providing access to said enclosure and a closed position substantially closing said first gate opening; and
   (c) latch means for releasably securing said first gate in its closed position.

3. The livestock chute according to claim 1 which includes:
   (a) each said side frame having an upper and a lower longitudinal member; and
   (b) said second end panel including a pair of upper sleeves each slidably receiving a respective upper longitudinal member and a pair of lower sleeves each slidably receiving a respective lower longitudinal member.

4. A livestock chute, which comprises:
   (a) a pair of opposite side frames positioned in spaced relation and each having a first and a second end;
   (b) a first end panel extending transversely between and interconnecting said first ends of said side frames;
   (c) a second end panel extending transversely between and interconnecting said side frames, said second end panel being longitudinally movable relative to said side frames between said first and second ends thereof and including:
      (1) a second end panel frame forming a gate opening; and
      (2) a second end panel gate swingably mounted on said second end panel frame, said second end panel gate being movable between an open position for access to an enclosure formed by said side frames and said end panels through said gate opening and a closed position substantially blocking said gate opening;
   (d) an access member having a proximate end pivotally attached to one of said side frames and a distal end adapted for attachment to said one side frame, said access member being pivotable between an open position for accessing said enclosure and a closed position; and
   (e) latch means for releasably securing said access member in its closed position.

5. The livestock chute according to claim 4 which includes:
   (a) each said side frame including a first and a second upright post at said first and second ends thereof respectively; and
   (b) a pair of transverse members each connecting a respective pair of said first upright posts and said second upright posts.

6. The livestock chute according to claim 4 wherein said first end panel includes:
   (a) a first gate opening;
   (b) a first gate swingably mounted on said first end panel, said gate being movable between an open position providing access to said enclosure and a closed position substantially closing said first gate opening; and
   (c) latch means for releasably securing said first gate in its closed position.

7. The livestock chute according to claim 4 which includes:
   (a) said side frame having an upper and a lower longitudinal member; and
   (b) said second end panel including a pair of upper sleeves each slidably receiving a respective upper longitudinal member and a pair of lower sleeves each slidably receiving a respective lower longitudinal member.

8. The livestock chute according to claim 4 which includes:
   (a) one of said end panels including an opening adapted to receive a head and a neck of an animal.

9. The livestock chute according to claim 4 which includes:
   (a) said access member comprising a longitudinal bar; and
   (b) said latch means comprising a projection extending from said one side frame and a sleeve slidably mounted on said bar and adapted for slidably receiving said projection.

10. The livestock chute according to claim 9 which includes:

(a) a guide mounted on said one side frame in proximity to said projection, said sleeve being slidably receivable between said projection and said guide.

11. The livestock chute according to claim 10 which includes:
(a) said projection and said guide each being cantilevered from said one side frame and terminating in a respective free end, said guide free end being positioned outwardly from said projection free end.

12. The livestock chute according to claim 10 which includes:
(a) said guide being positioned below said projection and having an upwardly concave and open configuration.

13. The livestock chute according to claim 9 which includes:
(a) means for simultaneously rotating and longitudinally sliding said sleeve with respect to said access member.

14. The livestock chute according to claim 13 wherein:
(a) said means for simultaneously rotating and sliding said sleeve comprises:
(1) a slot extending diagonally through said sleeve; and
(2) a guide pin fixedly mounted on and extending from said access member distal end, said guide pin being slidably received in said diagonal slot.

15. In a livestock chute having a pair of opposite side frames positioned in spaced relation in first and second end panels each extending transversely between and interconnecting said side frames, an enclosure for an animal being formed by said side frames and said end panels, the improvement of said access member including:
(a) a proximate end pivotally connected to one of said side frames;
(b) a distal end adapted for attachment to said one side frame;
(c) a projection from said one side frame;
(d) a guide mounted on said one side frame in proximity to said projection; and
(e) a sleeve slidably receiving said access member and adapted for slidably receiving said projection whereby said access member is releasably secured in a closed position with respect to said one side panel;
(f) said sleeve being slidably receivable between said guide and said projection.

16. The livestock chute according to claim 15 which includes:
(a) said projection having a free end;
(b) said guide having a free end positioned outwardly from said projection free end;
(c) said guide being positioned below said projection and having an upwardly concave and opened configuration.

17. In a livestock chute having a pair of opposite side frames positioned in spaced relation and first and second end panels each extending transversely between and interconnecting said side frames, an enclosure for an animal being formed by said side frames and said end panels, the improvement of an access member including:
(a) a proximate end pivotally connected to one of said side frames;
(b) a distal end adapted for attachment to said one side frame;
(c) a projection from said one side frame;
(d) a sleeve slidably receiving said access member and adapted for slidably receiving said projection whereby said access member is releasably secured in a closed position with respect to said one side panel; and
(e) means for simultaneously rotating and longitudinally sliding said sleeve with respect to said access member.

18. The livestock chute according to claim 17 wherein:
(a) said means for simultaneously rotating and sliding said sleeve comprises:
(1) a slot extending diagonally through said sleeve; and
(2) a guide pin fixedly mounted on and extending from said access member distal end, said guide pin being slidably received in said diagonal slot.

19. A latch for attaching a distal end of a member to a projection, which comprises:
(a) a sleeve slidably mounted on said distal end and adapted for slidably receiving said projection, said sleeve having a slot extending diagonally therethrough;
(b) a guide pin fixedly attached to and extending from said distal end, said guide pin being slidably received in said diagonal slot whereby said sleeve is adapted to simultaneously slide longitudinally and rotate relative to said distal end; and
(c) a guide positioned in spaced relation below said projection, said sleeve being slidably insertable between said guide and said projection.

20. A livestock chute, which comprises:
(a) a pair of opposite side frames positioned in spaced relation, each said side frame including:
(1) a first end;
(2) a second end;
(3) an upper and a lower longitudinal member extending between said first and second ends; and
(4) a first and a second upright corner post each positioned at a respective side frame first and second end and connected to said upper and lower longitudinal members;
(b) a first end panel extending transversely between and interconnecting said side frame first ends, said first end panel forming a first gate opening and having a first gate swingably attached thereto, said first gate being movable between a closed position across said first gate opening and an open position;
(c) a second end panel extending transversely between and interconnecting said side frames, said second end panel being longitudinally movable relative to said side frames between said first and second end thereof, said second end panel including:
(1) a second end panel frame forming a second gate opening;
(2) a pair of upper sleeves connected to said second end panel frame and each slidably receiving a respective upper longitudinal member;
(3) a pair of lower sleeves each connected to said second end panel frame and slidably receiving a respective lower longitudinal member;
(4) a second gate swingably mounted on said second end panel frame and movable between a closed position across said second gate opening and an open position; and (5) latch means for releasably securing said second gate to said second end panel frame in its closed position;
(d) an access member having a proximate end pivotally connected to one of said frames and a distal end, said access member being movable between a closed position with said distal end attached to said one side frame and an open position; and
(e) latch means for releasably securing said access member in its closed position which includes:
 (1) a projection extending from said one side frame; and
 (2) a sleeve slidably receiving said access member and adapted for slidably receiving said projection whereby said access member is locked in its closed position.

21. The livestock chute according to claim 20 which includes:
(a) said access member proximate end being pivotally mounted on one of said upright posts.

22. The livestock chute according to claim 20 which includes:
(a) said projection being attached to and extending from one of said upright posts.

23. The livestock chute according to claim 20 which includes:
(a) one of said side frames having an intermediate post extending between and interconnecting said upper and lower longitudinal members thereof intermediate said first and second posts;
(b) said projection being attached to and extending from said intermediate post.

* * * * *